United States Patent

Eriksson

[11] Patent Number: 5,303,744
[45] Date of Patent: Apr. 19, 1994

[54] PIPING PROTECTION ASSEMBLY

[75] Inventor: Juha Eriksson, Astorp, Sweden

[73] Assignee: Nestec S.A., Vevey, Switzerland

[21] Appl. No.: 929,684

[22] Filed: Aug. 13, 1992

[30] Foreign Application Priority Data

Sep. 27, 1991 [EP]  European Pat. Off. ........ 91116531.4

[51] Int. Cl.⁵ ............................................. F16L 11/00
[52] U.S. Cl. .................................... 138/110; 138/112; 138/113; 138/160
[58] Field of Search ............... 138/106, 108, 110, 112, 138/113, 114, 115, 117, 161, 163, 158, 103, 147, 148, 149, 160; 60/320

[56] References Cited

U.S. PATENT DOCUMENTS

| 385,119 | 6/1888 | Johns | 138/158 |
|---|---|---|---|
| 1,971,500 | 8/1934 | Palmer | 138/110 |
| 1,982,995 | 12/1934 | Lane | 138/106 |
| 2,129,865 | 9/1938 | Newport et al. | 138/158 |
| 2,621,903 | 12/1952 | Cohler | 138/113 |
| 2,634,759 | 4/1953 | Twickler | 138/113 |
| 2,741,268 | 4/1956 | Plunkett | 138/148 |
| 2,748,804 | 6/1956 | Guarnaschelli | 138/110 |
| 2,829,742 | 4/1958 | Wallace | 138/103 |
| 2,881,804 | 4/1959 | Bub et al. | 138/110 |
| 2,938,569 | 5/1960 | Goodrich | 138/110 |
| 2,980,568 | 4/1961 | Kazmierowicz |  |
| 3,741,252 | 6/1973 | Williams | 138/110 |
| 3,999,340 | 12/1976 | Bogese et al. | 138/103 |
| 4,016,727 | 4/1977 | Osaka et al. | 138/112 |
| 4,455,112 | 6/1984 | Anders | 138/112 |
| 4,543,998 | 10/1985 | Thomerson | 138/110 |
| 5,021,044 | 6/1991 | Sharkawy | 138/115 |

*Primary Examiner*—Philip R. Coe
*Assistant Examiner*—James F. Hook
*Attorney, Agent, or Firm*—Vogt & O'Donnell

[57] ABSTRACT

A piping assembly has spacers which are positioned on a pipe and spaced apart one from another along a length of the pipe. Each of the spacers extends from a perimeter of the pipe to a spacer perimeter surface which is interrupted by at least one gap defined by two spacer edges which extend towards the pipe perimeter from the spacer perimeter surface in a direction transverse to the spacer perimeter surface. A sleeve having apertures therethrough which form a mesh is positioned on and circumscribes the perimeter surfaces of at least two spacers and has edge portions bent at positions to extend to the spacer edges so that the sleeve is held in position on the spacers.

9 Claims, 1 Drawing Sheet

PIPING PROTECTION ASSEMBLY

BACKGROUND OF THE INVENTION

The present invention relates to a pipe protection assembly or hot pipes such as steam pipes.

In order to prevent factory personnel from accidentally touching steam pipes on the premises, the pipes are usually insulated with glass wool. Cleaning of the pipes is carried out by means of water under high pressure, but the water penetrates and destroys the glass wool which not only causes an unpleasant smell but it is also unhygienic.

SUMMARY OF THE INVENTION

It has been found that if a pipe is surrounded by a sleeve of flexible meshed material spaced from the pipe, cleaning is easy to perform, hygienic and the sleeve can be kept in place without the requirement of holding means such as clips.

Accordingly, the present invention provides a pipe surrounded by a sleeve spaced from the pipe by a spacer characterised in that the perimeter of the spacer is interrupted by a gap and the sleeve is made of a flexible meshed material having edges bent round the edges of the spacer defining the gap.

DETAILED DESCRIPTION OF THE INVENTION

In accordance with the present invention, the perimeter of the spacer may be interrupted by more than one gap, and in such a case, the sleeve advantageously consists of the same number of pieces of flexible meshed material as the number of gaps. The gap in the perimeter of the spacer may be a fissure or indent or it may extend through the body of the spacer to the pipe. Advantageously, the spacer consists of two halves joined together with a gap between the opposing edges which define the gap, on either side of the pipe, and the sleeve consists of two pieces of flexible meshed material, the longitudinal edges of each piece of which are bent round the edges of each half of the spacer, respectively.

The pipe is usually of circular cross-section. Depending on the length of the pipe, there may be a plurality of spacers, spaced from one another along the length of the pipe. The spacer is conveniently made of a plastics material, especially a heat-resistant plastics material, and may consist of one or more plastic wedges.

The sleeve is preferably made of a material with a certain degree of resilience or rigidity to enable it to be held in position on the spacer when its edges are bent round the edges of the spacer which define the gap. The sleeve may be made of a variety of materials, for example, plastics moulding, brass, galvanized sheet, but conveniently, the sleeve is made of a metal such as steel, especially stainless steel. The size of the apertures in the mesh is not critical, but advantageously, the apertures should be small enough to prevent the entry of an average person's finger for safety.

The present invention is useful for protecting pipes carrying steam or other hot fluids, e.g., in factories.

The present invention is illustrated by way of example only with reference to the accompanying drawings.

DETAILED DESCRIPTION OF THE DRAWINGS

Figure 1:
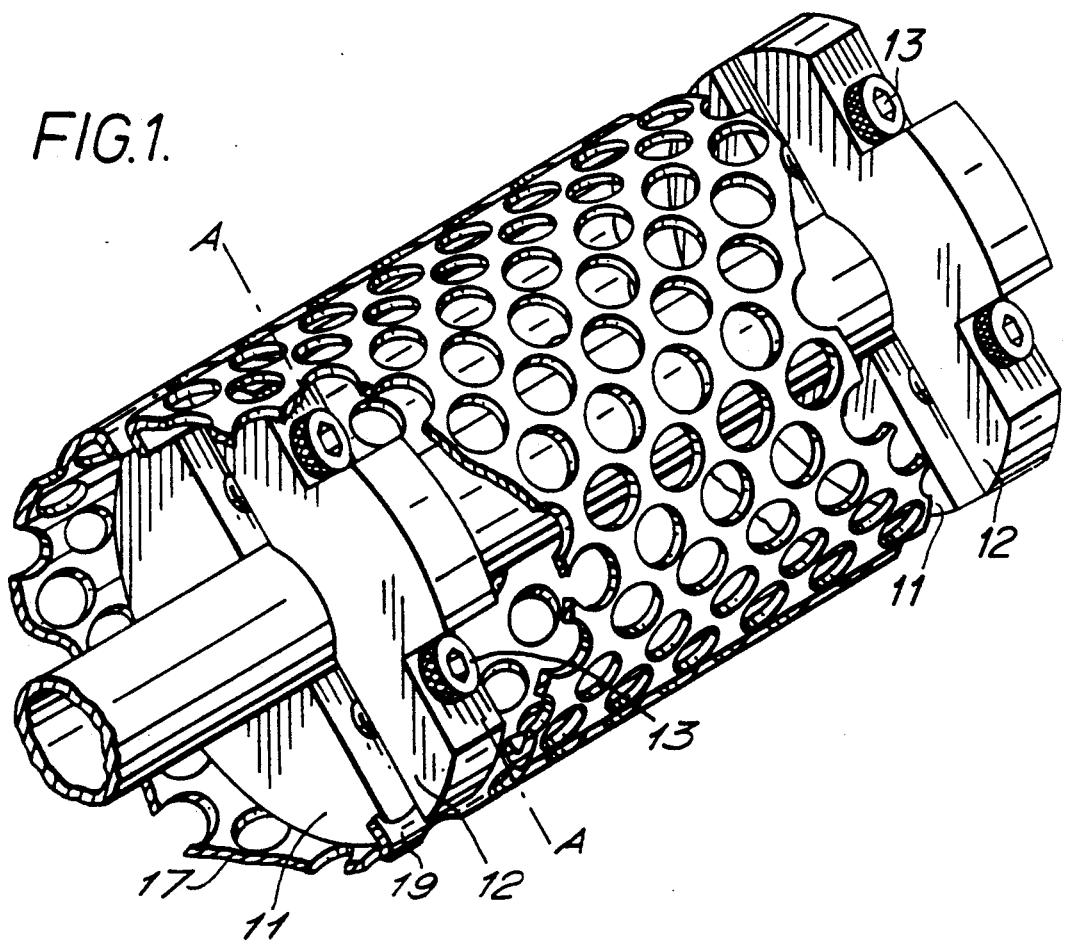
FIG. 1 shows a perspective diagrammatic view (partly cut away) of a pipe protected in accordance with the invention.
Figure 2:
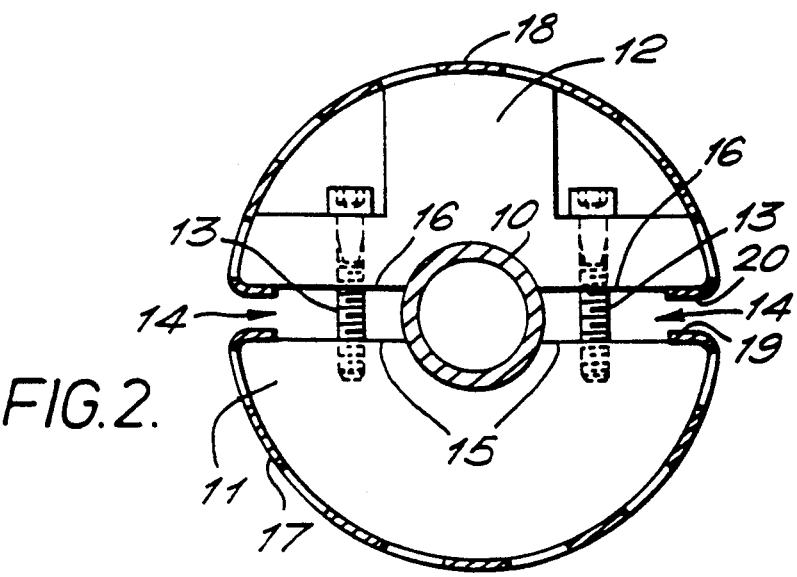
FIG. 2 shows a cross section through the line A—A of FIG. 1.

Referring to the drawings, a pipe 10 carrying steam is partially surrounded by heat-resistant plastic wedges 11, 12 which form two halves of a spacer, which, as shown, extend from the perimeter of pipe 10 and which are joined to one another by bolts 13 leaving gaps 14, which are defined by edge portions 15, 16, which extend in a direction transverse to the perimeter surface of the spacer, on either side of the pipe 10. Two pieces of stainless steel mesh 17, 18, which are from 1-5 mm thick, are fitted around the perimeter, surface of the two halves 11, 12, respectively, of the spacer, and the edges 19, 20 are bent around the respective edges 15, 16 of the two halves of the spacer where they are held in position without requiring any mechanical means such as clips.

The stainless mesh is easy to remove by levering off the halves of the spacer by means of a simple tool, if necessary.

I claim:

1. A piping assembly comprising:
   a pipe;
   at least two spacers which are positioned on the pipe and spaced apart one from another along a length of the pipe, each of which extends away from a perimeter of the pipe to a spacer perimeter surface interrupted by at least one gap defined by two spacer edges which extend towards the pipe perimeter from the spacer perimeter surface in a direction transverse to the spacer perimeter surface; and
   a sleeve which has apertures therethrough which form a mesh and which is positioned on and circumscribes the spacer perimeter surfaces of at least two spacers and which has edges bent at positions to extend to the spacer edges so that the sleeve is held in position on the spacers.

2. An assembly according to claim 1 wherein the spacers are formed of a heat-resistant plastic material.

3. An assembly according to claim 1 wherein the sleeve is plastic.

4. An assembly according to claim 1 wherein the sleeve is metal.

5. An assembly according to claim 1 wherein the sleeve is stainless steel.

6. An assembly according to claim 1 wherein the perimeter surface of each spacer is interrupted by two gaps which are positioned to be in an opposing relation about the pipe and wherein the sleeve is formed of two separate portions having edges bent at positions to extend to the spacer edges so that each sleeve portion is held in position on the spacers.

7. An assembly according to claim 6 wherein each spacer is formed of two pieces and the gaps are positioned between the two pieces and further comprising bolts which extend from a first spacer piece to a second spacer piece in a direction transverse to the spacer edges to hold the pieces together.

8. An assembly according to claim 1 wherein the sleeve is formed by a same number of separate portions as there are spacer gaps.

9. An assembly according to claim 8 wherein there are two spacer gaps and two sleeve portions.

* * * * *